United States Patent
Copsey et al.

(10) Patent No.: US 7,857,325 B2
(45) Date of Patent: Dec. 28, 2010

(54) ADJUSTABLE-HEIGHT SUSPENSION SYSTEM

(75) Inventors: Charles R. Copsey, American Fork, UT (US); Curtis J. McNeil, Herriman, UT (US)

(73) Assignee: SRATS, Inc., Springville, UT (US)

( * ) Notice: Subject to any disclaimer, the term of this patent is extended or adjusted under 35 U.S.C. 154(b) by 300 days.

(21) Appl. No.: 11/958,282

(22) Filed: Dec. 17, 2007

(65) Prior Publication Data

US 2009/0127812 A1 May 21, 2009

Related U.S. Application Data

(63) Continuation-in-part of application No. 11/602,583, filed on Nov. 21, 2006, now abandoned.

(60) Provisional application No. 60/946,974, filed on Jun. 28, 2007, provisional application No. 60/750,945, filed on Dec. 16, 2005.

(51) Int. Cl.
*B60G 17/00* (2006.01)
*B60G 17/08* (2006.01)

(52) U.S. Cl. ..................... 280/6.157; 267/175

(58) Field of Classification Search .......... 267/175, 267/177, 221; 280/5.514, 5.515, 5.519, 43, 280/43.17, 6.15, 6.157
See application file for complete search history.

(56) References Cited

U.S. PATENT DOCUMENTS

| | | | | |
|---|---|---|---|---|
| 3,025,076 A * | 3/1962 | Davies et al. | ............... | 280/104 |
| 4,819,754 A | 4/1989 | Purcell et al. | | |
| 4,846,317 A * | 7/1989 | Hudgens | ................ | 188/266.5 |
| 5,108,127 A * | 4/1992 | Chandler | ................ | 280/5.5 |
| 5,458,359 A * | 10/1995 | Brandt | ............. | 280/124.111 |
| 5,497,324 A | 3/1996 | Henry et al. | | |
| 5,676,355 A | 10/1997 | Hayashi et al. | | |
| 5,961,106 A * | 10/1999 | Shaffer | ................ | 267/221 |
| 5,984,286 A * | 11/1999 | Busch et al. | ............. | 267/218 |
| 6,357,768 B1 * | 3/2002 | Chan et al. | ............ | 280/124.106 |
| 6,361,027 B1 | 3/2002 | Lun | | |
| 6,435,532 B2 | 8/2002 | Hildebrand | | |
| 6,676,119 B2 * | 1/2004 | Becker et al. | ............ | 267/218 |
| 6,698,775 B2 * | 3/2004 | Ness | ................... | 280/86.757 |
| 6,921,097 B2 | 7/2005 | Ohlsson | | |
| 6,991,221 B1 | 1/2006 | Rodriguez | | |
| 7,063,334 B2 | 6/2006 | Lim | | |
| 7,475,894 B2 * | 1/2009 | Hodge | ............... | 280/124.116 |
| 2002/0180170 A1 * | 12/2002 | Anderson | ............ | 280/124.128 |
| 2005/0199457 A1 * | 9/2005 | Beck | ......................... | 188/314 |
| 2006/0012137 A1 * | 1/2006 | Sakamoto | .............. | 280/6.157 |
| 2008/0007021 A1 * | 1/2008 | Hodge | ................... | 280/124.1 |

OTHER PUBLICATIONS

Teraflex, *2004 Product Catalog*, p. 1-28.

* cited by examiner

*Primary Examiner*—Paul N Dickson
*Assistant Examiner*—Joseph Rocca
(74) *Attorney, Agent, or Firm*—Brownstein Hyatt Farber Schreck, LLP

(57) ABSTRACT

A system for adjusting the height or spacing between the frame and axle of a vehicle. The system may operate by manipulating a suspension system connecting the frame to the axle and comprising shock assemblies. The system may include hydraulic spacers selectively changing in length in unison, thereby manipulating the equilibrium positions of the shock assemblies and changing the distance between the frame and axle. Between changes in length, the hydraulic spacers may act as a substantially rigid bodies.

17 Claims, 12 Drawing Sheets ined States Patent

ADJUSTABLE-HEIGHT SUSPENSION SYSTEM

RELATED APPLICATIONS

This application: 1) claims the benefit of U.S. Provisional Patent Application Ser. No. 60/946,974 filed Jun. 28, 2007; and 2) is a continuation-in-part of U.S. patent application Ser. No. 11/602,583 filed Nov. 21, 2006 now abandoned, which claims the benefit of U.S. Provisional Patent Application Ser. No. 60/750,945 filed Dec. 16, 2005.

BACKGROUND

1. The Field of the Invention

This invention relates to vehicles and, more particularly, to novel systems and methods for suspensions excelling at high speed travel and low speed obstacle climbing.

2. The Background Art

Military operations and missions often involve geographic areas lacking the infrastructure enjoyed in the civilian world. For example, high speed travel on smooth roads may be common in civilian travel. Of course, military operations use civilian roads when possible. However, for a variety of reasons, modern warfare is often carried out in areas lacking the infrastructure for moving conventional troops in conventional vehicles.

Military operations must balance fire power, mobility, and protection. These criteria largely control the design of combat vehicles. A specific mission, whether artillery, infantry, armor, reconnaissance, or the like, will have a particular objective. Accordingly, such missions require vehicle configurations providing the fire power, mobility, and protection to accomplish their objectives.

As may be appreciated, mobility is itself a protection. The ability to arrive quickly, move rapidly, and withdraw speedily, provide a degree of protection from any response requiring significant time to mount. Certain combat vehicles have been designed to provide such mobility. However, a desired mobility in one environment has not translated into equal mobility in a different environment. Likewise, transport of sufficient fire power requires a vehicle designed to support the guns, rockets, mounting hardware, observation systems, personnel, and the like required to man the weapon systems.

Modern lightweight infantry and reconnaissance missions, basic missions that have existed for centuries, now operate over larger distances. Personnel and equipment must be projected across these larger distances. Additionally, massing armies requires significant time, materiel, money, personnel, and resources that perhaps do not exist. Moreover, such resources, if they do exist, are difficult to project into the theater. Finally, even if such resources were projected into the theater, they would likely be ineffective, as the resistance may evaporate faster than the mobilization speeds of such forces.

What is needed is a combat vehicle having the ability to deliver significant quantities of fire power, protection, and mobility over a wide range of environments. To be successful, the vehicle may be adapted to operate at the speeds of regular commercial vehicles on highways where available, travel cross country at high speed where the obstacles are comparatively few and somewhat predictable, and yet be able to crawl over rocks and terrain having no transportation infrastructure. Such a vehicle may not allow terrain to dictate the battle. Such a vehicle does not currently exist in commercial or military inventories.

BRIEF SUMMARY OF THE INVENTION

In view of the foregoing, in accordance with the invention as embodied and broadly described herein, a method and apparatus are disclosed in one embodiment of the present invention as including a frame of a vehicle, an axle, and a suspension system connecting the axle to the frame in order to define a range of axle motion between a neutral position, a compression portion extending from the neutral position toward the frame and an extension portion extending from the neutral position away from the frame. The system may include a first damper connecting the frame to the first end of the axle over its entire range of motion and a second damper having a housing with a movable shaft therein extendable from the housing to selectively engage the axle.

Typically, the shaft would engage the axle substantially exclusively during the compression portion of motion of the axle with respect to the frame. In certain embodiments, the suspension system would include springs between the frame and the axle, which may be of a coil spring or other type of spring. The first damper may be actually positioned colinearly with, or even within a first coil spring. An additional (third) damper may be connected to the frame and the other end of the axle to operate over its full range of motion with a fourth damper acting only in a compression portion of the second end.

The axles may be stabilized by a set of bars constituting a four-bar linkage. That is, a four-bar linkage is a classical engineering structure that may be applied to stabilizing the axle for improved vertical motion without departing from the frame in other degrees of freedom.

A damper may be connected to the frame to engage the axle, and may be configured as a "bump stop." Typically, first and third dampers may be shock absorbers connected to operate throughout the full range of motion of an axle. By contrast, bump stops (e.g. dampers two and four) would be configured to operate only during compression of an axle toward a frame, and would have no influence, and may include no contact, during an extension portion where an axle is moving on its suspension system away from a frame. Nevertheless, these bump stop dampers may be configured and installed to engage the axle throughout a majority of the compression portion of the axle's deflection or displacement toward the frame.

Thus, a vehicle having a frame and an axle with first and second ends may include a suspension system connecting the axle to the frame to define the range of motion for each end between a neutral position and compression portion of displacement between the neutral position and a position toward the frame, and an extension portion from the neutral position to a location further from the frame. A first damper or shock absorber connecting the frame to the first end of the axle operates over the entire range of motion of the axle. A second damper, typically comprising a housing and a shaft to extend from the housing is connected substantially rigidly to the frame, with the shaft extending to engage the first end of the axle only during the compression portion of displacement of the axle with respect to the frame.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE INVENTION

Figure 1:
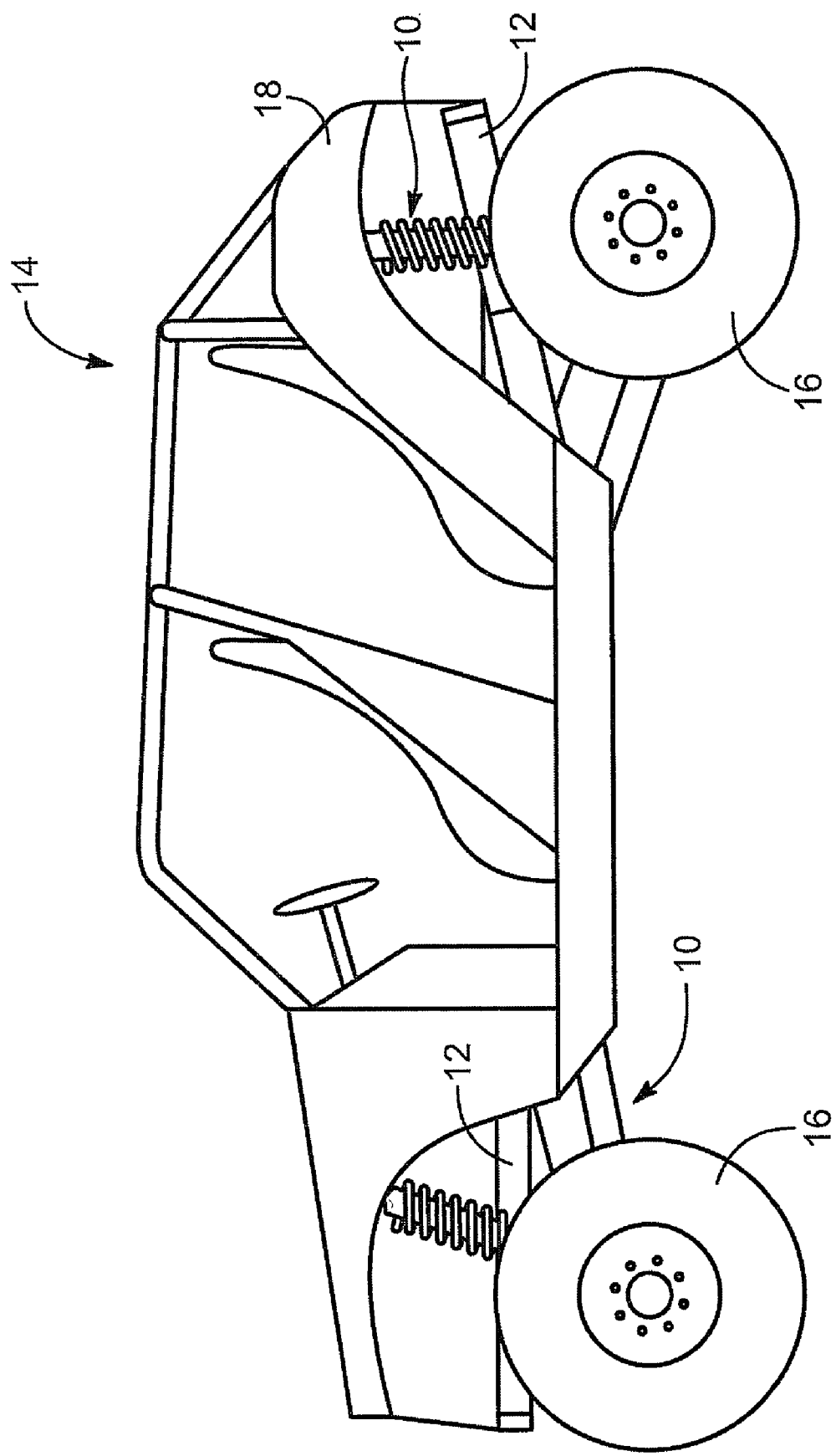
FIG. 1 is a side view of one embodiment of a vehicle in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, suspension systems are numerous and may include any particular arrangement of components to ameliorate the shocks and displacements of tires and wheels with respect to the frame to which they are attached. Thus, a suspension system may reduce the stresses, impacts, motion, and the like imposed on the frame of a vehicle.

Just as a transmission may be designed to interface between a vehicle engine, and the running gear to which the engine is applied to best serve the vehicle's function, suspension systems may be designed according to the intended function of the vehicle. For example, a tractor, truck, and car, may all use the same engine. However, according to the loads applied, the speeds anticipated, and the like, a transmission may be designed or selected to operate in each application. Similarly, a suspension system may be function specific. In general, the suspension system may be considered a key element rendering a vehicle suitable for its intended function.

For example, a combat main battle tank typically uses a torsion bar suspension system. Such systems often include torsion bars of comparatively large diameters, on the order of three to four inches, extending across the full width of the tank. At the end of each torsion bar, and possibly even continuous with the material, may be a lever arm orthogonally extending from the main torsion bar. This lever arm terminates with yet another orthogonal projection substantially parallel to the torsion bar. This projection then supports the hub of an idler wheel. Thus, the idler wheels running along the track are supported by a torsion bar suspension system. Meanwhile, tanks do not usually include highly damped (shock absorbed) suspension systems.

By contrast, small sedans typically include a simple A-frame suspension or McPherson struts employing lightweight coil springs having a modest spring constant. Likewise, utility vehicles such as trucks may have large coil springs, large leaf springs, or a pneumatic, elastomeric bag suspension system selectively lifting the frame with respect to the axles and wheels.

With each suspension system, a balance must be met between the force required to support the vehicle with its intended cargo, the smoothness of the ride, and the total travel expected in a wheel operating over the surface (e.g., an open pit mine, highway, cross country route, logs, boulders, smooth salt on a salt flat, bumpy or rutted surfaces, obstacles, steep inclines, and the like).

Springs within a suspension system may be coil springs, leaf springs, torsion springs, torsion rods, or the like. In general, a spring applies a force as a linear function of displacement. For example, displacement of a frame some distance with respect to an axle (toward or away from) may produce a spring force proportional to the distance. Thus, as a frame of a vehicle moves closer toward an axle of that vehicle, the spring exerts more force to tend to lift the frame away from the axle.

Of course, by axle, is not necessarily meant a single straight, monolith extending between two hubs. Typically, suspension systems may be independent in many modern vehicles. For example, a wheel may be suspended with a McPherson strut system. Such a system provides a single rocker arm below, with a combination spring and shock absorber attached to the body. Thus, the body forms a fixed member, while the rocker arm forms a second member, and the shock absorber and spring form a third member of variable length.

Typically, suspension systems configured to accommodate high rates of speed include stiff springs (i.e., springs having a comparatively high spring constant) and stiff shock absorbers (i.e., absorbers having a comparatively high resistive force). It is exemplary to look at a performance race car. A race car will typically operate on a comparatively smooth track. Nevertheless, such a car will operate at high speeds (e.g., seventy to in excess of two hundred miles per hour) in which the response of the suspension system must be comparatively very fast.

On the other hand, the total distance of travel on such a smooth surface is comparatively small. Thus, a suspension need only travel a few inches, and the spring system may be comparatively stiff. Likewise, damping at comparatively high velocities must be comparatively strong to immediately damp out any oscillations begun by a rapid impact of a tire against an obstacle or an irregularity in the track surface. Thus, such a suspension system will typically have a comparatively stiff spring, a stiff shock absorber, and relatively little travel.

At an opposite extreme, all-terrain vehicles (e.g., "four-wheelers") use a different suspension system. For example, such vehicles typically operate at less than forty miles per hour. Most of the travel is actually conducted between five and fifteen miles per hour. Such vehicles typically may travel an entire day at an average speed of only ten miles per hour.

Likewise, jeeps and "rock crawlers" may travel an entire day over boulder terrain, covering less than five miles. Typical of such systems are very large degrees of travel. Displacements (travel) of a tire may range from maximum descent below the frame to maximum ascent up toward or above the frame. This range may be about fourteen inches. Such vehicles may travel in terrain wherein one tire may actually be positioned three to four feet above the opposite tire of the vehicle. That is, a combination of large displacements in the suspension mechanisms and the ability of the frame to tilt on terrain without rolling over may provide substantial differences in the relative positions of opposite wheels on a vehicle.

Theoretically, a vehicle can be built with any amount of travel in the suspension system. Nevertheless, the travel, spring stiffness, and damping stiffness will control the ability of the vehicle to navigate large obstacles as well as the ability to respond quickly to damp out oscillations and push a tire back onto the supporting surface (e.g., track, road, or the like).

Typically, suspension systems cannot handle both the extremes of high speed travel and large displacement, low speed (crawler) travel. When one looks at the parameters controlling suspension systems, one realizes that the requirements of each of these extrema are antithetical to one another. For example, large displacements typically require a softer (lower spring constant) spring suspension. Likewise, at very low speeds, little or no shock absorption is needed, since the response times available are very long (e.g., one or more seconds) for the return from displaced to neutral positions.

By contrast, a race car at two hundred miles per hour has only milliseconds to put a tire back on the ground. Thus, the comparative travel and stiffness of high speed vehicles are antithetical to the wide range of displacements and spring constants as well as damping systems for a crawling vehicle.

A suspension system 10 in accordance with the present invention may provide the connection scheme between a frame 12 (chassis 12) of a vehicle 14 and the axles and wheels 16 thereof. The frame 12 in turn may support the body 18 of the vehicle 14. Alternatively, the frame 12 and body 18 may be formed as an integral unit (e.g., unibody construction). The body 14 may provide the interface between the frame 12 and the cargo or passengers.

A suspension system 10 in accordance with the present invention may be designed to perform well at the speeds of regular commercial vehicles on highways where available, travel cross country at high speed where the obstacles are comparatively few and somewhat predictable, and yet be able to crawl over rocks and terrain having little or no transportation infrastructure. In selected embodiments, such a system 10 may include a spring system in which each spring is actually a combination of a "light" spring (having a comparatively low spring constant), and a comparatively "heavy" spring (having a comparatively large spring constant). These springs may be arranged in series and be mechanically connected to provide multiple spring constants with changes of displacement. Likewise, displacement (e.g. vertical travel) may be attenuated by an additional and independent mechanism.

Figure 2:
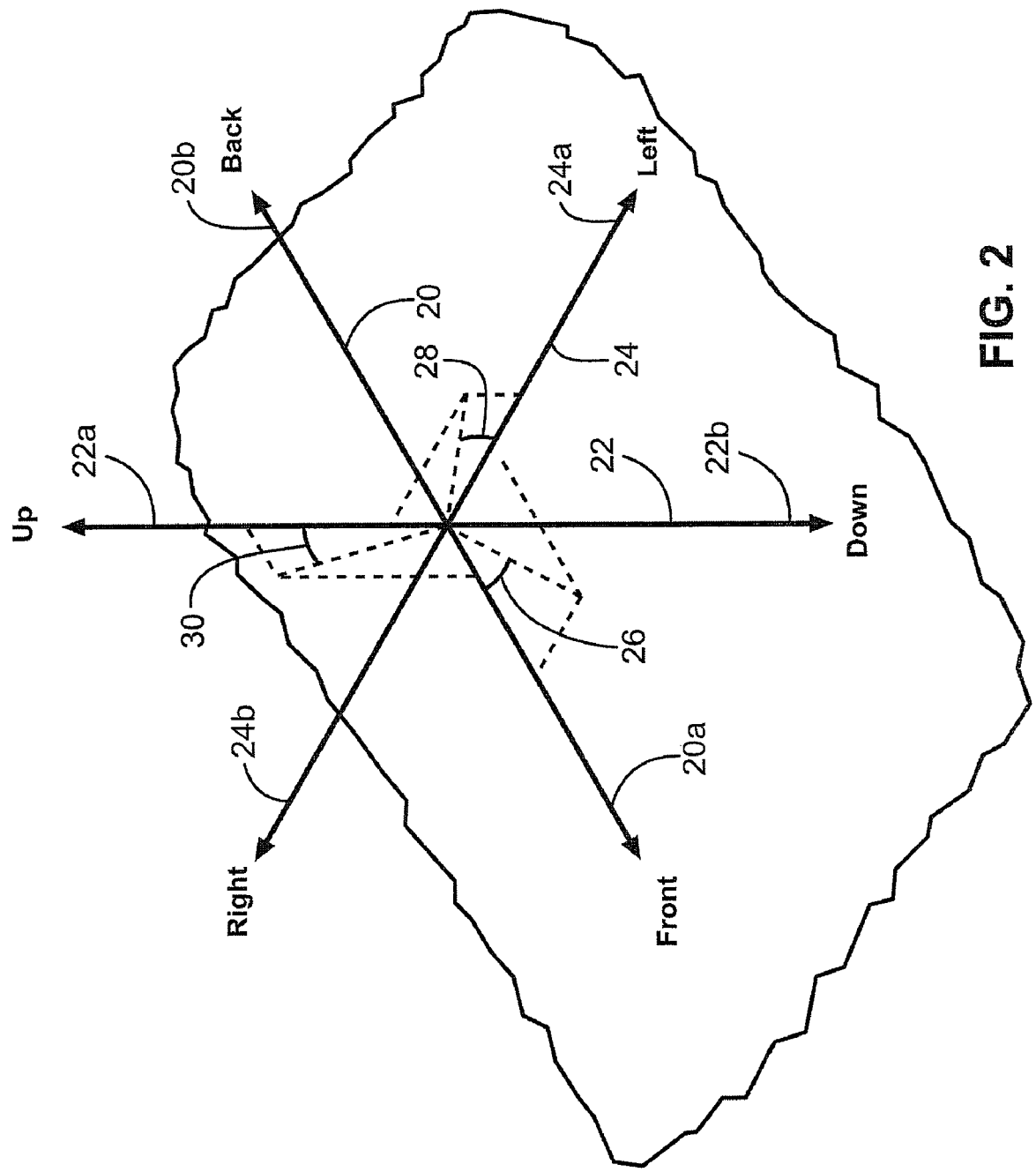
FIG. 2 is a perspective view of various axes and angles for orienting various component in accordance with the present invention.

Referring to FIG. 2, a set of axes 20, 22, 24 may define a three dimensional space. In the context of a vehicle 14, one may think of a forward direction with respect to a driver as being one axis 20a, and the reverse direction being another axis 20b parallel thereto or colinear. Likewise, up may be represented by one axis 22a and down may be represented by another axis 22b parallel thereto or colinear. Similarly, a leftward direction with respect to the operating surface on which a vehicle travels may be represented by one axis 24a, and the right (opposite) direction may be represented by another axis 24b.

Overall, the front and back directions 20a, 20b may define a longitudinal axis 20. The up and down directions 22a, 22b may define a transverse axis 22. The left and right directions 24a, 24b may define a lateral axis 24. Accordingly, the longitudinal, transverse, and lateral axis 20, 22, 24 may be substantially orthogonal to one another.

Using such a set of axes 20, 22, 24, various angles 26, 28, 30 may be defined. For example, one may be an angle 26 projected onto the plane containing the longitudinal and lateral axes 20, 24, as measured from the forward pointing longitudinal axis 20a. In other words, such an angle 26 is measured from the forward pointing longitudinal axis 20a when viewing an object in a direction perpendicular to the plane (e.g. nominally horizontal plane) containing the longitudinal and lateral axes 20, 24.

Another may be an angle 28 projected onto the plane (e.g. nominally vertical plane) containing the transverse and lateral axes 22, 24, as measured from the leftward pointing lateral axis 24a. Yet another may be the angle 30 projected by a selected object onto the plane containing the longitudinal and transverse axes 20, 22, as measured from the upward pointing transverse axis 22a.

Figure 3:
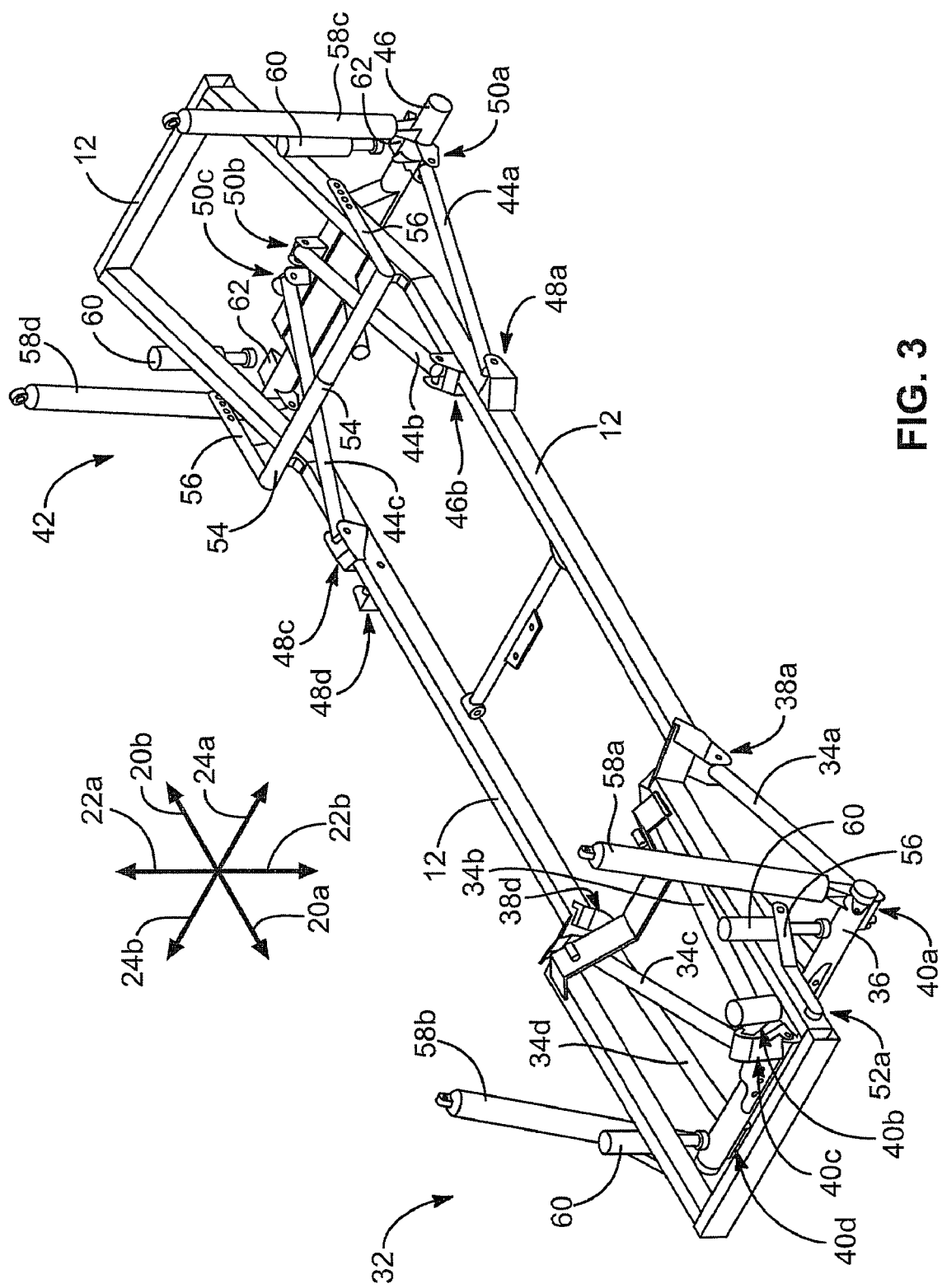
FIG. 3 is a perspective view of an assembly in accordance with the present invention comprising a frame, front axle, rear axle, and a suspension system.
Figure 4:
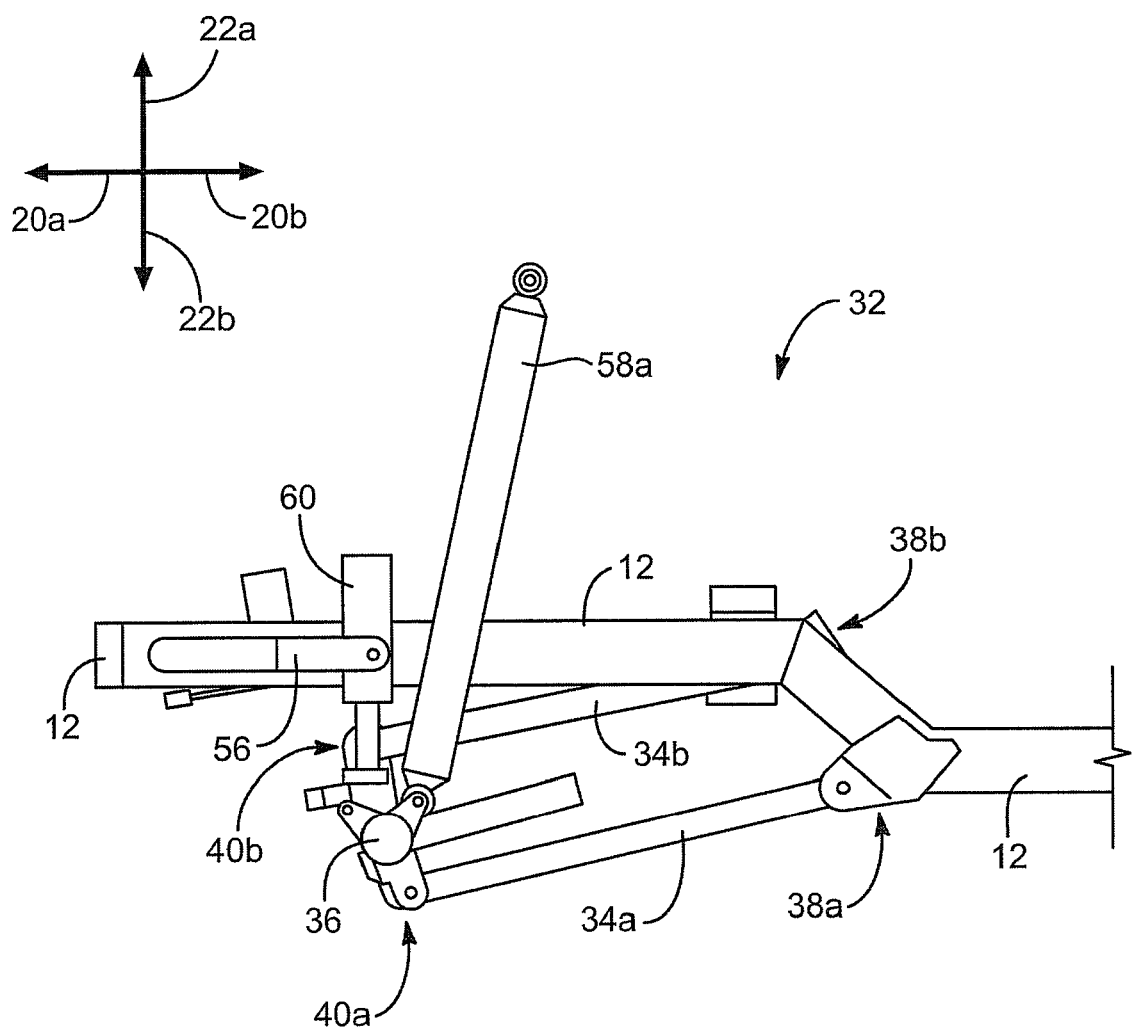
FIG. 4 is a side view of the front portion of the assembly of FIG. 3.
Figure 5:
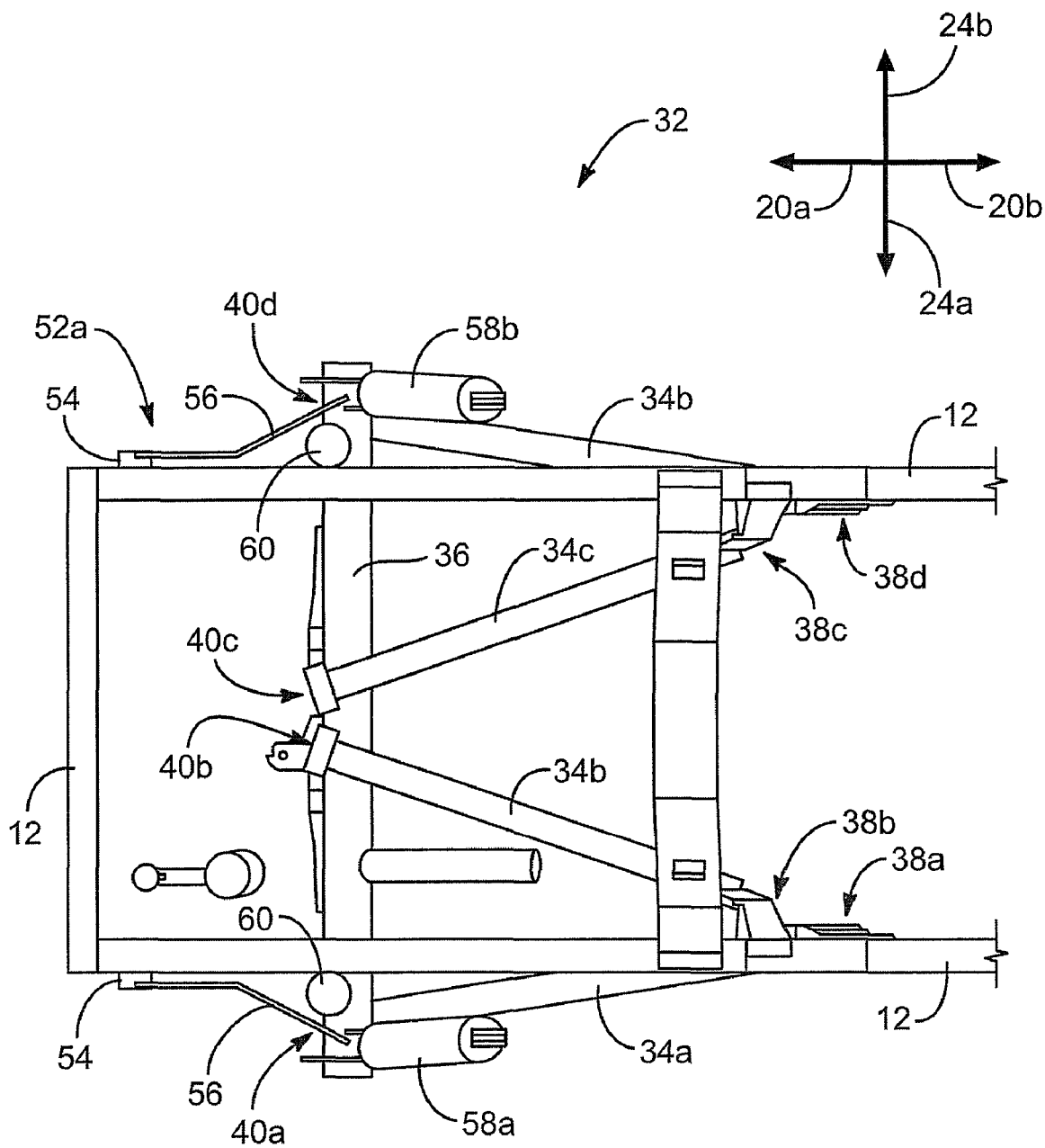
FIG. 5 is a top view of the front portion of the assembly of FIG. 3.

Referring to FIGS. 3-5, the front end portion 32 of a suspension system 10 in accordance with the present invention may include various links 34 or control arms 34 connecting the front axle 36 to the frame 12. The placement of the links 34 may determine certain handling characteristics. Likewise, the length and position of the links 34 may control the motion through which the axle 36 of the vehicle 14 may pass as it moves away from and toward the frame 12.

In selected embodiments, four links 34a, 34b, 34c, 34d may connect the front axle 36 to the frame 12. The four links 34 may be arranged in a W-shape. Accordingly, an outer, lower link 34a may extend from a frame bracket 38a secured to the frame 12 to an axle bracket 40a secured to the axle 36. The axle bracket 40a may extend from the lower surface of the axle 36, increasing the leverage that may be exerted by the outer, lower link 34a on the axle 36.

An inner, upper link 34b may extend from a frame bracket 38b secured to the frame 12 to an axle bracket 40b secured to the axle 36. The axle bracket 40b may extend from the upper surface of the axle 36, increasing the leverage that may be exerted by the inner, upper link 34b on the axle 36. Accordingly, the outer, lower link 34a and the inner, upper link 34b may operate on an opposite side of the axle 36. In general, the links 34a, 34b may capture the axle 36 between them, each pivotably connected to provide a quasi-parallelogram-type motion. Additionally, the links 34a, 34b may be positioned with respect to one another such that, when combined with the axle 36, they form a triangular structure capable of resisting loads imposed on the axle 36 along the lateral axis 24.

While the outer, lower link 34a and the inner, upper link 34b may secure one half of the axle 36, other links 34c, 34d, formed and positioned as substantially mirror images thereof, may secure the other half of the axle 36. Accordingly, a second inner upper link 34c may extend from a frame bracket 38c secured to the frame 12 to an axle bracket 40c extending from the top of the axle 36. A second outer, lower link 34d may extend from a frame bracket 38d secured to the frame 12 to an axle bracket 40d extending from the bottom of the axle 36. Accordingly, the second outer, lower link 34d and the second inner, upper link 34c may operate on an opposite side of the axle 36 to capture the axle 36 therebetween.

So configured, the outer, lower links 34a, 34d may form the two outer legs of the W-shape, while the inner, upper links 34b, 34c may form the two inner legs of the W-shape. Accordingly, the four links 34a, 34b, 34c, 34d may operate together to allow movement of the axle 36 in the transverse direction 22 with respect to the frame 12, but resist movement of the axle 36 in the longitudinal and lateral directions 20, 24 with respect to the frame 12.

In certain embodiments, the links 34 may designed to have a particular length, a particular orientation, and a particular location of attachment to the various brackets 38, 40. This particular geometry may control the arc of travel of the axle 36 with respect to the frame 12. Likewise, the geometry may control the leverage the suspension system 10 may impose on the vehicle 14.

In military applications, reliability, availability, maintainability, and durability of systems and components are critical factors. Therefore, numbers of unique parts may be minimized. Accordingly, in embodiment of an apparatus and method in accordance with the invention, the basic units for each of the links 34 may be substantially identical. While each link 34 may include adjustment members on the ends thereof, the main portion of the links 34 may be common therebetween. Accordingly, by stocking only one part design, any of the links 34 may be replaced thereby, should the need arise.

In contrast, the typical suspension systems for original equipment manufacture of commercial vehicles the design parameters for control arms are such that upper links will typically have a length of approximately seventy percent of the length of corresponding lower links. Accordingly, in one embodiment of an apparatus and method in accordance with the invention, the particular location of the brackets 38, 40 may be selected to accommodate links 34 of substantially equal length, while maintaining an acceptable range of motion for the axle 36 with respect to the frame 12.

In selected embodiments, the positioning of the various brackets 38, 40 may be articulated in terms of vertical separation (i.e., separation in the transverse direction 22), as measured from pivot bolt to pivot bolt, and horizontal separation (i.e., separation in the plane defined by the longitudinal and lateral directions 20, 24) as measured from inside of mounting bracket to inside of mounting bracket. The length of the various links 34 may be articulated in terms of the distance between the pivotable engagements with the corresponding brackets 38, 40.

Using this dimensional basis, in one embodiment, the length of the inner, upper links 34b, 34c may be about 28.4 inches. The length of the outer, lower links 34a, 34d may be about 29.6 inches. The vertical separation between the frame bracket 38a and frame bracket 38b (as well as between the frame bracket 38c and frame bracket 38d) may be about 2 inches. The horizontal separation between frame bracket 38a and frame bracket 38b (as well as between frame bracket 38c and frame bracket 38d) may be about 7.1 inches. The horizontal separation between the frame bracket 38a and frame bracket 38d may be about 27.5 inches. The horizontal separation between frame bracket 38b and frame bracket 38c may be about 20.8 inches.

The vertical separation between axle bracket 40a and axle bracket 30b (as well as between axle bracket 40c and axle bracket 40d) may be about 9.5 inches. The horizontal separation between axle bracket 40b and axle bracket 40c may be about 1 inch. The horizontal separation between axle bracket 40a and axle bracket 40d may be about 36 to 38 inches.

Figure 6:
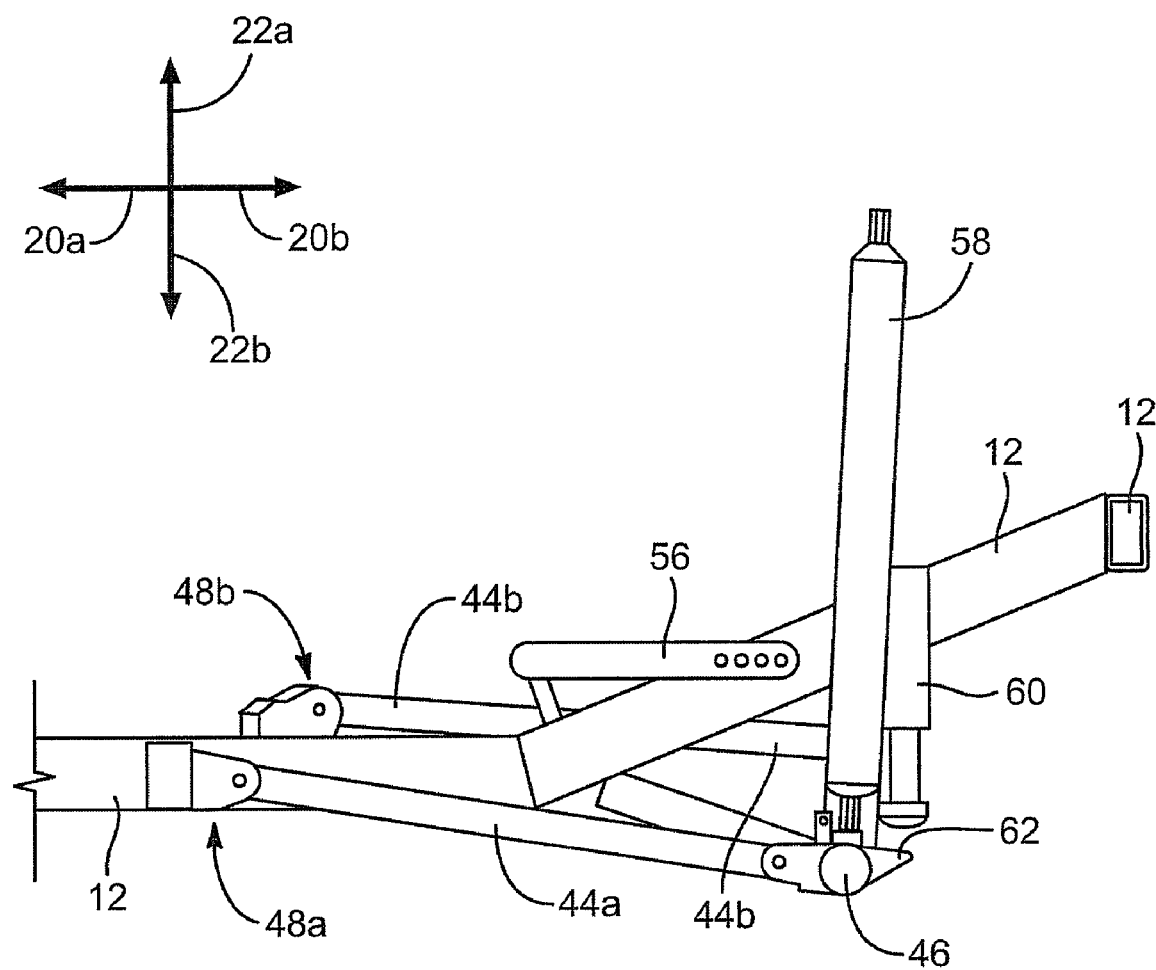
FIG. 6 is a side view of the rear portion of the assembly of FIG. 3.
Figure 7:
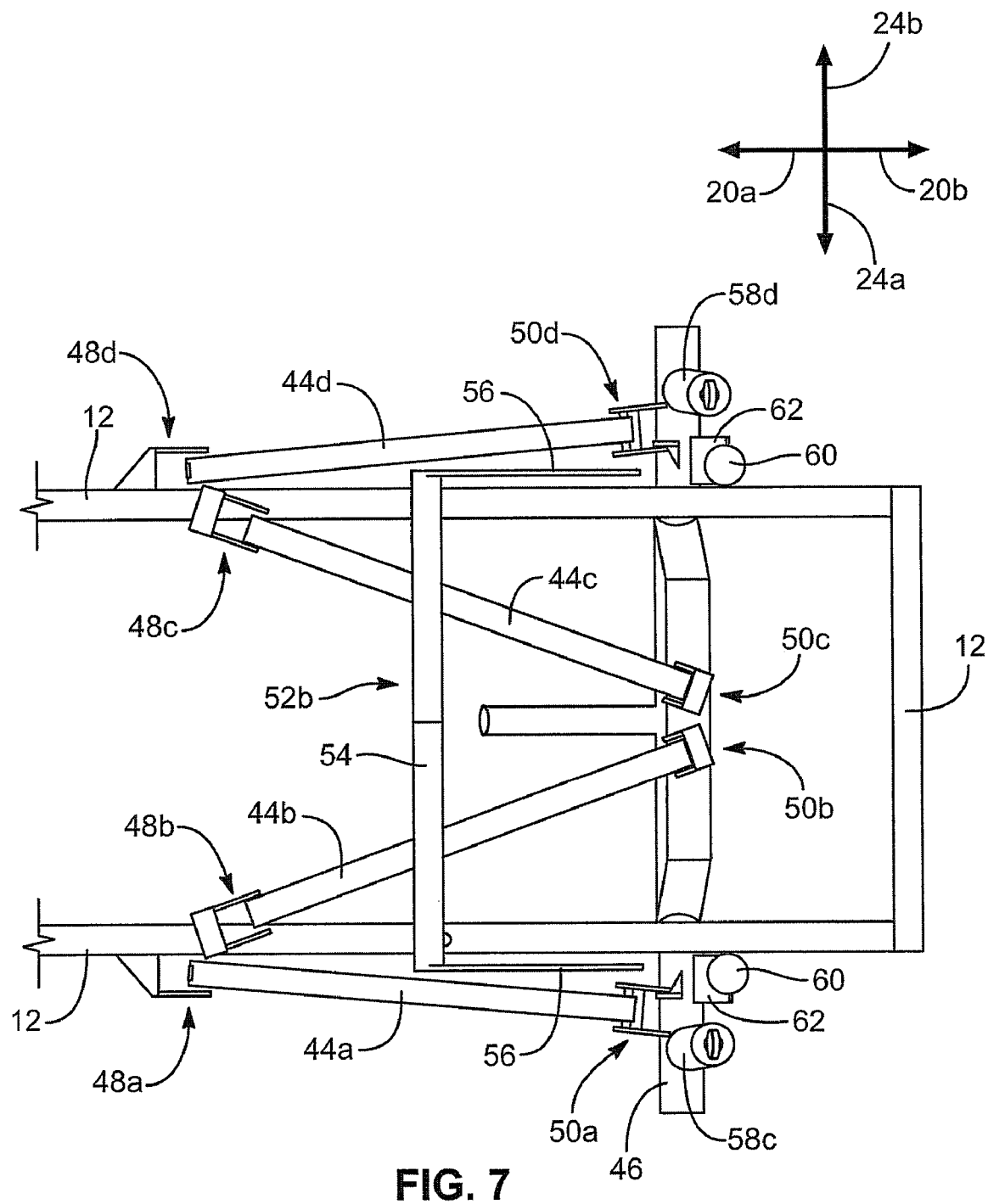
FIG. 7 is a top view of the rear portion of the assembly of FIG. 3.

Referring to FIGS. 3, 6, and 7, the rear portion 42 of a suspension system 10 in accordance with the present invention may include various links 44 connecting the rear axle 46 to the frame 12. As with the front links 34, the placement of the rear links 44 may determine certain handling characteristics for the vehicle 14, as well as the range of motion of the rear axle 46.

In selected embodiments, four links 44a, 44b, 44c, 44d may connect the rear axle 46 to the frame 12. Again, the four links 44 may be arranged in a W-shape. Accordingly, the links 44 may comprise two outer, lower links 44a, 44d and two inner, upper links 44b, 44c. One outer, lower link 44a may extend from a frame bracket 48a secured to the frame 12 to an axle bracket 40a secured to the axle 46. The axle bracket 40a may extend from the rearward facing surface of the axle 46. One inner, upper link 44b may extend from a frame bracket 48b secured to the frame 12 to an axle bracket 50b secured to the axle 46. The axle bracket 50b may extend from the upper surface of the axle 46, increasing the leverage that may be exerted by the inner, upper link 44b on the axle 46.

In general, the links 44a, 44b may capture the axle 46 between them, each pivotably connected to provide a quasi-parallelogram-type motion. Additionally, the links 44a, 44b may be positioned with respect to one another such that, when combined with the axle 46, they form a triangular structure capable of resisting loads imposed on the axle 46 along the lateral axis 24.

In selected embodiments, the positioning of the various brackets 48, 50 and the lengths of the various links 44 may be articulated in the terms set forth in relation to the front end portion 32 of the vehicle. Using such a dimensional basis, in one embodiment, the length of the inner, upper links 44b, 44c may be about 33.8 inches. The length of the outer, lower links 44a, 44d may be about 31.5 inches.

The vertical separation between the frame bracket 48a and frame bracket 48b (as well as between the frame bracket 48c and frame bracket 48d) may be about 3.8 inches. The horizontal separation between the frame bracket 48a and frame bracket 48b (as well as between the frame bracket 48c and frame bracket 48d) may be about 4.0 inches. The horizontal separation between the frame bracket 48a and frame bracket 48d may be about 32.0 inches. The horizontal separation between frame bracket 48b and frame bracket 48c may be about 25.0 inches.

The vertical separation between the axle bracket 50a and axle bracket 50b (as well as between the axle bracket 50c and axle bracket 50d) may be about 5.8 inches. The horizontal separation between the axle bracket 50b and axle bracket 50c may be about 2.3 inches. The horizontal separation between the axle bracket 50a and axle bracket 50d may be about 37.3 inches.

Referring to FIGS. 3-7, of course the dimensions discussed hereinabove with respect to both the front and rear portions 32, 42 may be only approximations. Different numerical arrangements may be used within the scope of the present invention. If desired or necessary, the dimensions discussed hereinabove may be scaled to suit various applications.

In certain embodiments, the basic units for each of the rear links 44 may be substantially identical. While each link 44 may include adjustment members on the ends thereof, the main portion of the links 44 may be common therebetween. Accordingly, by stocking only one part design, any one of the links 44 may be replaced thereby, should the need arise. In selected embodiments, the main portions of the rear links 44 may be common with the main portions of the front link 34. In such embodiments, by stocking only one part design, any of the links 34, 44 may be replaced, should the need arise.

Axles 36, 46 in accordance with the present invention may have any suitable configuration. In selected embodiments, an axle 36, 46 may be selected to provide a desired reliability, availability, maintainability, durability, strength, clearance, and the like. In one embodiment, a variant of a Dana brand Sixty Series axle has been found to be suitable.

The position of the links 34, 44 may control the amount of "squat" and "anti-squat" that the vehicle 14 will undergo as a result of the deflection or movement of the suspension system 10. That is, when the brakes are engaged, or when the engine is engaged to deliver rotation to the tires 16, the suspension system 10 may compress (squat), decompress (anti-squat), or remain substantially neutral in response thereto. In selected embodiments, the links 34, 44 may be positioned to resolve any torque applied to a wheel 16 without significant squat or anti-squat.

In certain embodiments, a suspension system 10 in accordance with the present invention may include an arrangement of sway bars 52. For example, the system 10 may include a front sway bar 52*a* and a rear sway bar 52*b*. These sway bars 52 may control rotation of the frame 12 with respect to the axles 36, 46 about the longitudinal axis 20. That is, the sway bars 52 may assist in controlling the roll of the body 18 with respect to the axles 36, 46.

In selected embodiments, a sway bar 52 may include a tubular member 54 maintaining the position of a torsion shaft or torsion bar. The torsion bar is secured at each end to an arm 56. Each of the arms 56 may then be connected to a corresponding axle 36, 46. Accordingly, if one side of the axle 36, 46 moves up or down, the torsion bar urges a similar movement in the same direction by the other side (end) of the axle 36, 46.

In certain embodiments, a suspension system 10 in accordance with the present invention may include shocks 58, each positioned so as to be proximate one of each of the four wheels 16. Accordingly, a suspension system 10 may include four shocks 58*a*, 58*b*, 58*c*, 58*d*. In certain embodiments, a shock 58 may actually comprise a "coil-over-shock" assembly having one or more springs surrounding a shock absorber. Such a shock absorber may comprise an oil-filled cylinder having a piston running therein with orifices to control the passage of oil into another chamber or through the piston face. In selected embodiments, a shock 58 may have a body about 2.5 inches in diameter and provide about 14 inches of travel.

If desired, shocks 58 may be positioned at specific angles. The orientation of each shock 58 with respect to the ground and with respect to the frame 12 may have a dramatic effect on the handling of a vehicle 14. Depending upon the angle at which the shock 58 is oriented with respect to the axle 36, 46, an inch of vertical displacement of the axle 36, 46 may not require an inch of travel within the shock 58, as may be determined according to the vector analysis of the relative motion.

In one embodiment, each of the front shocks 58*a*, 58*b* may be mounted at an angle 30 of about negative 12.4 degrees. That is, the shock absorbers 58*a*, 58*b* may angle backward 20*b* in traversing from the bottoms to the tops thereof. The shocks 58*a*, 58*b* may simultaneously be mounted at an angle 28 of about 90 degrees. Accordingly, the shocks 58*a*, 58*b* may not be angled to one side 24*a* or the other 24*b*.

Each of the rear shocks 58*c*, 58*d* may be mounted at an angle 30 of about negative 3 degrees. Accordingly, the shock absorbers 58*c*, 58*d* may angle backward 20*b* in traversing from the bottoms to the tops thereof. One shock 58*c* may simultaneously be mounted at an angle 28 of about 95 degrees, while the other 58*d* may be mounted at an angle 28 of about 85 degrees. Accordingly, the tops of the shocks 58*c*, 58*b* tilt towards the interior of the vehicle 14.

In certain embodiments, a bump stop 60 may be installed proximate each shock 58. Accordingly, a suspension system 10 may typically include four bump stops 60*a*, 60*b*, 60*c*, 60*d*. A bump stop 60 may limit bottoming out. Additionally, a bump stop 60 may control the tendency of a vehicle 14 to roll. This may be done by limiting the gap of movement allowed under comparatively weaker spring resistance force before the comparatively stronger spring force of the bump stop 60 engages the abutting surface (e.g., axle 36, 46, abutment plate 62 extending from an axle 36, 46, or the like).

Figure 8:
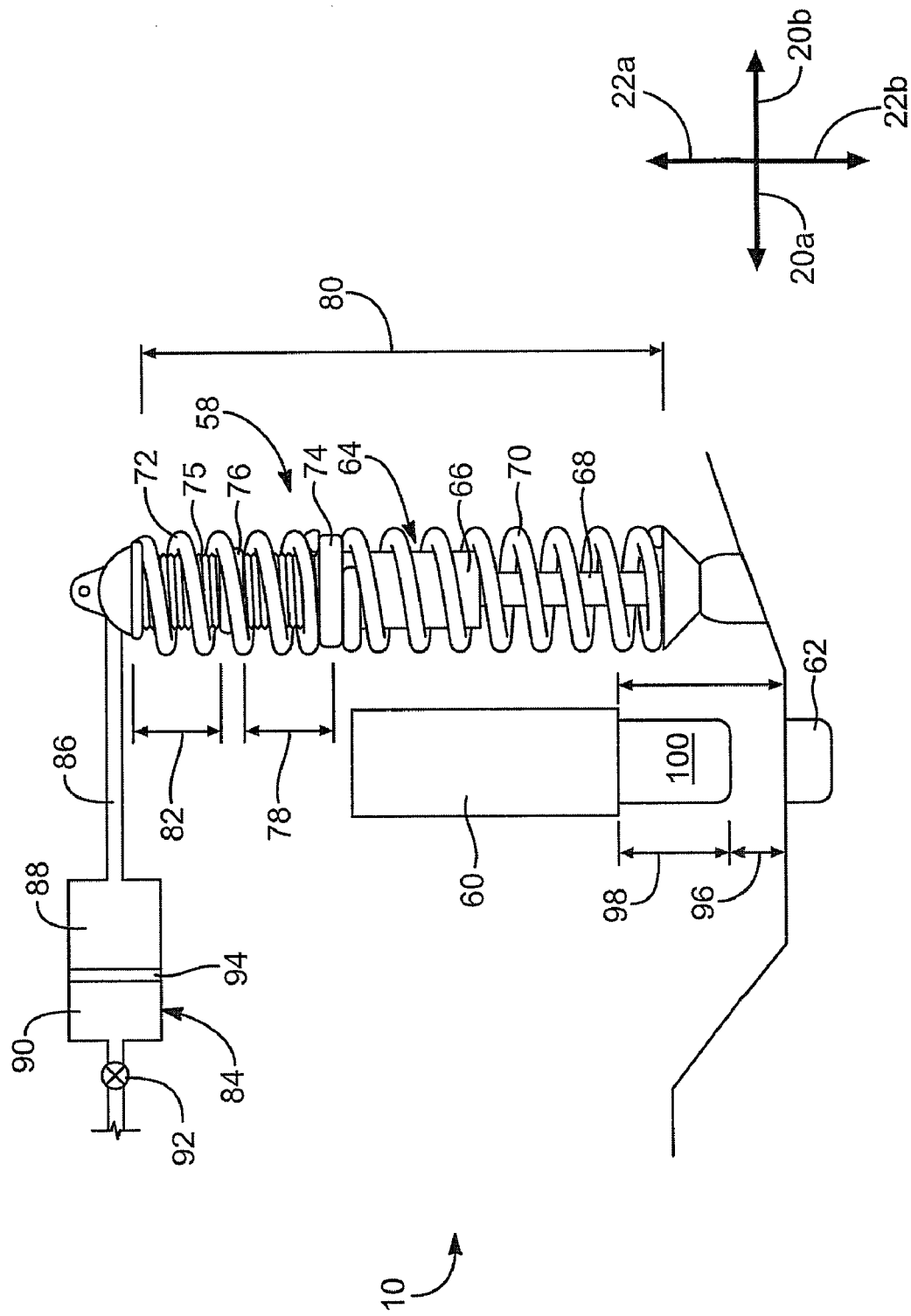
FIG. 8 is an end view of a shock, bump stop, and axle configured in accordance with the present invention.

Referring to FIG. 8, in selected embodiments, a shock 58 may pivotably connect to an axle 36, 46 at a lower end and pivotably connect to the frame 12 or body 18 at an upper end. A shock 58 may include a shock absorber 64 comprising a body 66 with a shaft 68 extending therewithin. The shaft 68 may move within and with respect to the body 66 in order to provide damping. Typically, a piston having multiple orifices secures to the end of the shaft 66 to travel through an oil bath within the body 66.

In certain embodiments, a shock 58 may further include two coil springs 70, 72 surrounding the shock absorber 64. The two springs 70, 72 may be positioned in series. An interface 74 may connect the two springs 70, 72. Accordingly, as the two springs 70, 72 and the shock absorber 64 compress and expand, the interface 74 may travel along the body 66 of the shock absorber 64.

In certain embodiments, at least a portion 75 of an outside surface of the body 66 of the shock absorber 64 may be threaded. Using these threads, a stop 76 (sometimes referred to as a secondary spring stop) may be positioned and secured with respect to the body 66. In selected embodiments, the stop 76 may limit the travel of the interface 74 along the body 66 of the shock absorber 64. For example, the stop 76 may define the maximum height in the transverse direction 22 that the interface 74 may attain. So configured, the stop 76 may determine when the shock 58 transitions from compressing both springs 70, 72, to compressing only one spring 70. Accordingly, the stop 76 may provide an added control over the handling of the suspension system 10.

In selected embodiments, the spring constants of the two springs 70, 72 may be significantly different from one from another. For example, the lower spring 70 may be significantly stiffer than the upper spring 72. In other embodiments, however, the relative positions may be switched or otherwise altered. A distance 78 may define the spacing between the interface 74 and the stop 76. The stop 76 may define the distance of travel of the frame 12 of the vehicle 14 under the influence of the lighter, upper spring 72 before further compression will be limited to the lower spring 70.

That is, both the lower and upper springs 70, 72 may deflect with any relative movement of the frame 12. However, given the difference in spring constants, the lower spring 70 may compress or expand comparatively less. Upon engagement of the stop 76 by the interface 74, the upper spring 72 is effectively removed from the compression path, as the stop 76 resists any further compression of the upper spring 72. Accordingly, all further compression must be accommodated by the comparatively stiffer, lower spring 70.

In general, the lighter (softer, weaker) spring 72 may be responsible for the comfort of a ride. The lighter spring 72 may accommodate the majority of any initial travel (e.g., compression), and may provide that travel at a comparatively lower force requirement. Nevertheless, in most current suspension systems, the lighter spring 72 will be allowed only very limited compression by an appropriate setting of the stop 76. That is, the distance 78 between the interface 74 and the stop 76, when the shock 58 is in a neutral position, may be small (e.g., on the order of one inch).

Accordingly, the lighter spring 72 may provide a comfortable, lightweight resistance to small deflections caused by small obstacles and small variations in the position of the axle 36, 46 with respect to the frame 12. Nevertheless, anything over a comparatively modest travel (adjustment in the length 80 of the shock 58 more than about one inch) will be directed immediately to the heavier spring 70. Thus, the heavier spring 70 is quickly engaged to provide a high speed, high frequency response in harsh driving conditions where control and performance are important (i.e., in high speed applications).

In contrast, in selected embodiments in accordance with the present invention, the distance 78 between the interface 74 and the stop 76, when the shock 58 is in a neutral position, may substantially increase from the typical installation to about four to six inches on a shock 58 having a two and one half inch diameter body 66 and fourteen inches of possible travel. Of course, this distance 78 may vary according to the size of the shock 58.

As a practical reality, the distance 82 that the stop 76 is set away from the top end of the shock body 66 may actually represent some unused travel of the shock 58. Accordingly, in some embodiments in accordance with the present invention, the stop 76 may be positioned so as to not reduce the travel of the shock 58. For example, the stop 76 may be positioned such that if the upper spring 72 were to be compressed completely, the interface 74 would still not abut the stop 76. Alternatively, the stop 76 may be positioned to abut the interface 76 at a position selected to protect the upper spring 72 from an undesirable excess compression.

In certain embodiments, the gas spring 84 or the reservoir system 84 associated with a shock absorber 64 may actually be a separate and remote apparatus. For example, in one alternative embodiment, a gas spring or reservoir 84 may be connected by a line 86 to sustain the appropriate pressure to exchange oil 88 with the actual housing 66 of the shock absorber 64.

In such an embodiment, a gas chamber 90 pressurized with a gas (e.g., nitrogen) through a valve 92 may thus be adjusted to provide a particular relative displacement of the separator 94. That is, the chamber 90 may be pressurized, yet the actual gas therein may be separated by the divider 94 from the oil 88. In such a manner, the gas in the chamber 90 may provide a literal gas spring maintaining minimum volume of dissolved or entrained gases within the oil chamber 88, as well as providing a gas spring effect augmenting the forces of the springs 70, 72.

In one embodiment of an apparatus and method in accordance with the invention, the pressure in the gas chamber 90 may be adjusted with the range from about one hundred fifty to about two hundred sixty pounds per square inch. The gas chamber 90 influences the rebound or response and tracking by the shaft 68, as opposed to substantially overriding the effect of either of the springs 70, 72 in actually supporting the weight of the vehicle 14.

The spring constant selected for each spring 70, 72 as well as the relative position of the stop 76 may dramatically effect the handling characteristics of a vehicle 14 in accordance with the present invention. By balancing spring constants for the springs 70, 72, the position of the stop 76 limiting travel before engaging exclusively the lower spring 70, the gap 96 before engagement of the bump stop 60, and the travel 98 of the shaft 100 of the bump stop 60, a vehicle 10 in accordance with the present invention may having a suspension system 10 capable of stable high speed travel and highly articulated, lower speed travel. The bump stop 60 and shock absorbers may provide resistance dependant upon their speed of motion. Thus, large displacements at slow speeds would be resisted by very much lower forces than would rapid displacements.

A distance 96 may define the spacing between a bump stop 60 and an axle 36, 46, or any generic structure connected to the axle 36, 46 and positioned to contact the bump stop 60 (e.g., extension plate 62, axle housing, or the like). In selected embodiments in accordance with the present invention, the gap 96 or distance 96 is typically set at between from about one half inch to about two and one half inches. In one embodiment, the gap 96 at the front axle 36 may be about one half inch to about two and one half inches, while the gap 96 at the rear axle 46 may be about one half inch to about three inches.

The gap 96 is the distance that the axle 36, 46 can travel with respect to the frame 12 before the bump stop 60 is engaged and begins to resist that travel. By sizing the gap 96, one may control the time when damping by the bump stop 60 will begin, and the extent or distance over which that damping will occur.

All mechanical processes consume time. The speed of a vehicle 14 may affect the speed at which an axle 36, 46 may be driven toward a bump stop 60. Accordingly, the gap 96 to be traversed by the axle 36, 46 before engagement with the shaft 100 is a timing, or frequency, matter. Likewise, the overall travel 98 represents a distance that the shaft 100 may travel during engagement by the axle 36, 46. This overall travel 98 may affect the dynamic response (e.g., frequency, time of travel, stroke, and so forth).

In certain embodiments, a bump stop 60 may be a nitrogen-pressurized shock absorber. Accordingly, there may be a certain degree of gas spring capability within the bump stop 60. Thus, a pressure or "over-pressure" on top of the oil in a bump stop 60 may determine the effective spring constant when the shaft 100 is driven into the housing of the bump stop 60.

In concert with, and controlling, the dynamic response may be a drag setting for an orifice passing oil within the bump stop 60, as well as the gas pressure (e.g., nitrogen over pressure) acting to pressurize that oil supply. The gas pressure may urge the collapse of entrained air bubbles. That is, rapid motion, spraying, orifice passage, and the like for liquids will typically entrain larger volumes of air. Moreover, cavitation on the back side of an orifice will often times cause a vacuum creating bubbles. These bubbles may create additional soft "springiness" when they are allowed to be collapsed. Accordingly, the gas pressure may act upon the oil to maintain those gas bubbles condensed in solution, or at least minimized in size.

In one embodiment of a bump stop 60, the bump stop 60 may actually operate substantially different from a regular shock absorber. For example, as the over pressure may actually act as a gas spring within the bump stop 60, the gas and oil may actually be mixed in a single chamber with no intervening piston, bladder, or impermeable interface. In such an embodiment, all the gas present acts as a hydraulic driver to extend the shaft 100 from the body of the bump stop 60. Accordingly, all gas acts intentionally as a spring in such an embodiment and has no need to be separated by a membrane from the oil.

Such a simplified embodiment is often suitable since a bump stop 100 is not undergoing continual motion. That is, by contrast, a shock absorber 64 may be undergoing substantially constant motion in direct response to the vertical displacement of the axle 36, 46. By contrast, the intervening gap 96 may isolate the shaft 100 and the bump stop 60, to a certain extent, from the direct interaction and immediate response to the axle 36, 46. A bump stop 60 may, therefore, rely on the gas contained therein to act as the spring for both return of the shaft 100 toward the axle 36, 46, as well as resisting upward movement of the axle 36, 46.

In one currently contemplated embodiment of an apparatus in accordance with the invention, the gap 96 may be set at, for example, about one half inch or less. At such a setting, the bump stop 60 may serve an anti-sway function. That is, as a vehicle 14 moves through a turn, centrifugal forces tend to roll the body 18. Accordingly, as the outermost (radially speaking) side of the body 18 moves outward, the bump stop 60, and the shaft 100 in particular, draw near the axle 36, 46 on that outermost side. Prompt engagement of the axle 36, 46 by the shaft 100 upon traverse of a comparatively small gap 96, may provides anti-sway support. Accordingly, a suspension system 10 that may otherwise be loose with excessive sway may be tightened and controlled without sacrificing low speed displacement. An apparatus and method in accordance with the invention may thus be configured to meet a hybridized purpose (high frequency small-displacement, stiff suspension on smooth roads; low frequency, large displacement, soft suspension on crawled obstacles) never previously available or required.

Typically, for conventional, high-speed systems, the distance 96 between a bump stop 60 and the axle 36, 46 would be set at a comparatively large value to act as an overload shock like an overload spring. So positioned, the bump stop 60 is not engaged in high speed travel on an infrastructure road. Its only purpose is to protect the shock by preventing a hard or abrupt bottoming out. Thus, bump stops 60 have only been used to control one extreme of the suspension's range of motion.

In contrast, by setting the distance 96 in the range from about zero inches to about three inches, the bump stop 60 may influence a much larger portion of the range of motion of the suspension system 10, and particular of the compressive stroke. For example, in selected embodiments, a bump stop 60 may be positioned to affect anywhere from about one hundred to about seventy-five percent of the compressive stroke (i.e., movement of the axle 36, 46 upward from the neutral position). Accordingly, the bump stop 60 may provide a significant added dimension of control, not just a protection against bottoming out.

In selected embodiments, to control the gap 96, the bump stop 60 may be installed at a particular position selected to establish that gap 96. This position may be significantly closer to the axle 36, 46 than in conventional, high speed systems. In some embodiments, the stroke and length of the shaft 100 may be adjusted or designed to provide a certain gap 96.

In certain embodiments, the travel 98 of a bump stop 60 may be about five inches. Alternatively, a bump stop 60 comprising about four inches of travel and a shaft 100 having a diameter of about one and five eighths inches has been found to be suitable. If desired, a bump stop 60 may include an external oil reserve, gas spring, or some combination thereof. In certain embodiments, a bump stop 60 may have travel of up to about six inches. In general, the travel 98 may be defined as the distance that a bump stop 60 may permit an axle 36, 46 to move once the shaft 100 engages an abutting surface associated with the axle 36, 46. Accordingly, the travel 98 is the distance of engagement during which the additional damping of the bump stop 60 and any additional spring constant of the nitrogen over-pressure in the bump stop 60 may be applied to restrain movement of the axle 36, 46. Additionally, in selected embodiments, the orifices, or other drag mechanisms moving through the oil bath typical of a bump stop 60, may control the stiffness with which the axle 36, 46 may be damped.

In general, a bump stop 60 in accordance with the present invention may be set and designed to operate in conjunction with the springs 70, 72 to manage the difference in requirements for high speed and low speed travel. That is, the bump stop 60 may be positioned to provide an additional degree of damping, spring, or both controls over the relative movement between the axle 36, 46 and the frame 12.

At high speed travel, the bump stop 60 may compensate for leaving the lighter spring 72 within the suspension system 10. That is, in current high speed systems, the stop 76 may be positioned to effectively remove the lighter spring 72 from acting in the suspension after comparatively small compressions. Thus, the heavy spring 70 largely dictates the handling, providing the high frequency and high force required for high speed travel. However, in the present invention, the lighter spring 70 may remain active and available should a large deflection at slower speeds be needed.

The bump stop 60 may simply compensate for the softness of the lighter spring 72 at high speed when a tighter, more responsive suspension in needed. Accordingly, the bump stop 60 may act as simply an override to make sure that high force, high frequency deflections do not take advantage of the lighter spring 72, thereby destroying the desired tight handling. However, when the slow cycles and lower forces characteristic of large displacements (e.g., rock crawling) are needed, the shaft 100 of the bump stop 60 may be pushed back into the housing and out of the way (e.g. such as by virtue of slow displacement with corresponding minimal damping), allowing the shock 58 its full range of motion.

In one embodiment of an apparatus and method in accordance with the invention, a vehicle with no additional adjustments may actually traverse various highly diverse environments (e.g., highway, cross country, and rough terrain). In another alternative embodiment, by mere addition of gas pressure (e.g. gas spring pressure of a bump stop 60, gas spring 84, or both) or slight adjustments of particular components, such as the position of one or more stops 76 or the gap 96 between the bump stop 96 and the axle 36, 46, a vehicle 14 may be adjusted in a matter of minutes to readily accept diverse terrain.

Moreover, in one embodiment of an apparatus and method in accordance with the invention, a suspension system 10 may be immediately tuned to a particular mission. That is, for example, the pressures in the bump stops 60 and the gas spring 84 may be quickly adjusted, or even automatically adjusted from within the vehicle, and the stop 76 may be immediately adjusted to tune the suspension system 10, in a matter of moments, to a level of improved performance for a particular mission within one of the three foregoing environments.

In selected embodiments, a vehicle 10 in accordance with the present invention may be designed for selective failure. That is, in difficult terrain, it is possible for bouncing or other loadings to overload a part to the point where it fails. For example, a cyclical bouncing load may cause a drive train component to fail.

Certain failures may be more easily corrected that others. For example, the repair of an internally positioned component may be more difficult than a repair of a component that is easily accessible. Moreover, certain components may be more costly to replace than others. Accordingly, a vehicle 14 in accordance with the present invention may be configured such that a component that may be easily replaced is sized or otherwise designed to fail before other more costly or less accessible parts.

In one embodiment, the load capacity of a universal joint may be selected to be significantly less that the load capacity of both axles, hubs, and the like. In such an embodiment, it the drive train were to fail, that failure would most likely occur at that universal joint. Due to its location, the universal joint may be more easily replaced. Thus, more expensive components as well as components that are more difficult to replace may be protected. In another embodiment, the drive shaft or shafts may be configured as the point of selective failure.

Figure 9:
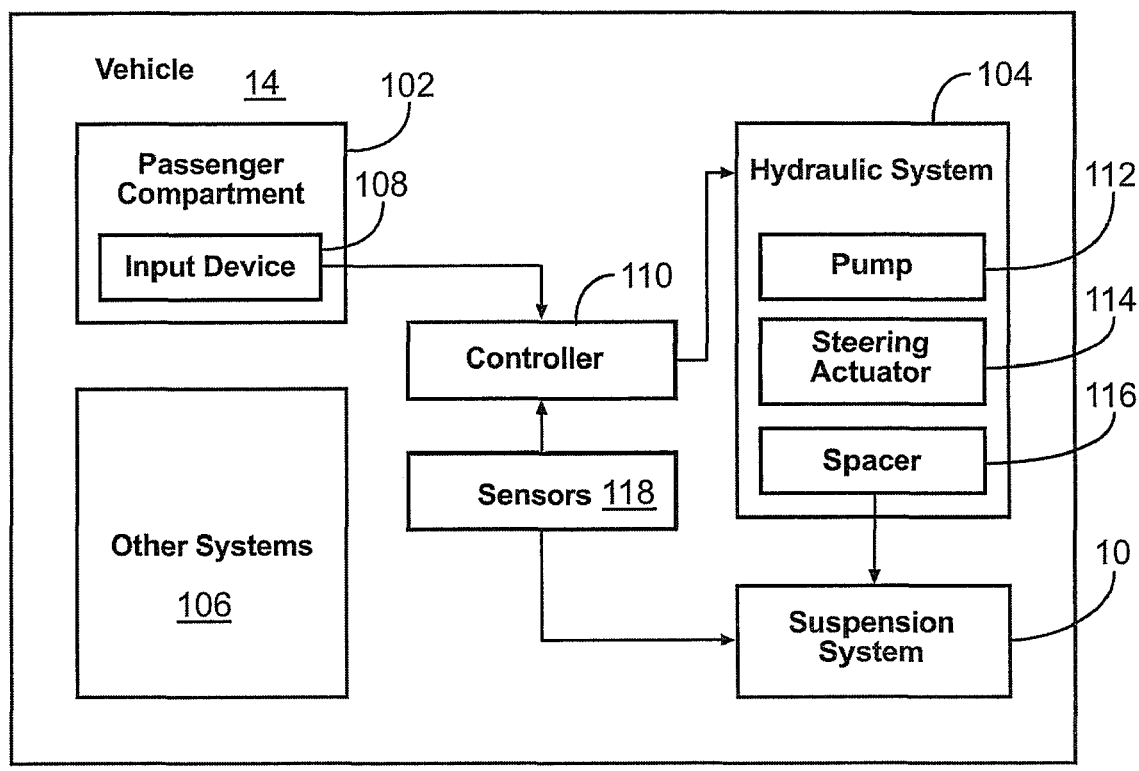
FIG. 9 is a schematic block diagram of a vehicle with one or more spacers manipulating the suspension system to provide adjustments in vehicle height.

Referring to FIG. 9, in certain embodiments, it may be desirable to provide a vehicle 14 having adjustable height. In certain applications, a particular stance or height of vehicle may be desired. For example, in rough terrain, or in applications requiring significant axle articulation, greater height or space between an axle 36, 46 and the frame 12 of the vehicle may be desired. Conversely, in high speed applications or when a vehicle 14 is to be transported within some other vehicle or aircraft of limited size, less height may be desired. Moreover, it may be desirable to provide adjustments in height "on-the-fly." In such embodiments, adjustments in height of a vehicle 14 may be accomplished without stopping the vehicle 14.

In selected embodiments, a vehicle 14 in accordance with the present invention may include a passenger compartment 102 or cab 102, a hydraulic system 104, a suspension system 10, as well as other systems 106 and structures. In certain embodiments, a hydraulic system 104 may effect change in the height or stance of the vehicle 14.

For example, inside the passenger compartment 102 may be one or more input devices 108 receiving from a user instructions corresponding to a desired change in vehicle height. In one embodiment, an input device may be a knob presenting various options for selection by a user. For example, a knob may present three predetermined vehicle heights such as a lowest height setting, an intermediate height setting, and a maximum height setting. When encountering rough terrain where significant wheel articulation is desirable, a user may adjust the knob to a maximum height setting. Conversely, when loading the vehicle in a confined space or beginning a high speed maneuver, a user may select the lowest height setting.

In selected embodiments, instructions received by an input device 108 may be passed directly to the hydraulic system 104 for implementation. Alternatively, those instructions may be passed to a controller 110, which may condition, convert, or otherwise modify or interpret the instructions before passing them on to the hydraulic system 104. When instructed to do so, the hydraulic system 104 may change the height of the vehicle 14 through manipulations of the suspension system 10.

In selected embodiments, a hydraulic system 104 may include one or more pumps 112 urging flow of hydraulic fluid. A hydraulic system 104 may also include a steering actuator 114. Accordingly, a hydraulic system 104 in accordance with the present invention may be a power steering system 104. A hydraulic system 104 may also include one or more spacers 116 directly manipulating the suspension system 10.

In certain embodiments, instructions sent by an input device 108 or a controller 110 may be implemented by a hydraulic system 104 without any additional control loop. Alternatively, a vehicle 14 may include a feedback system. For example, a vehicle 14 may include one or more sensors 118. Such sensors 118 may monitor the effect of the spacers 116 on the suspension system 10. The sensors 118 may inform a controller 110 when the desired change in height of the vehicle 14 is achieved. Accordingly, upon receipt of such confirmation, a controller 110 may instructed a hydraulic system 104 to cease further manipulation of the suspension system 10.

Figure 10:
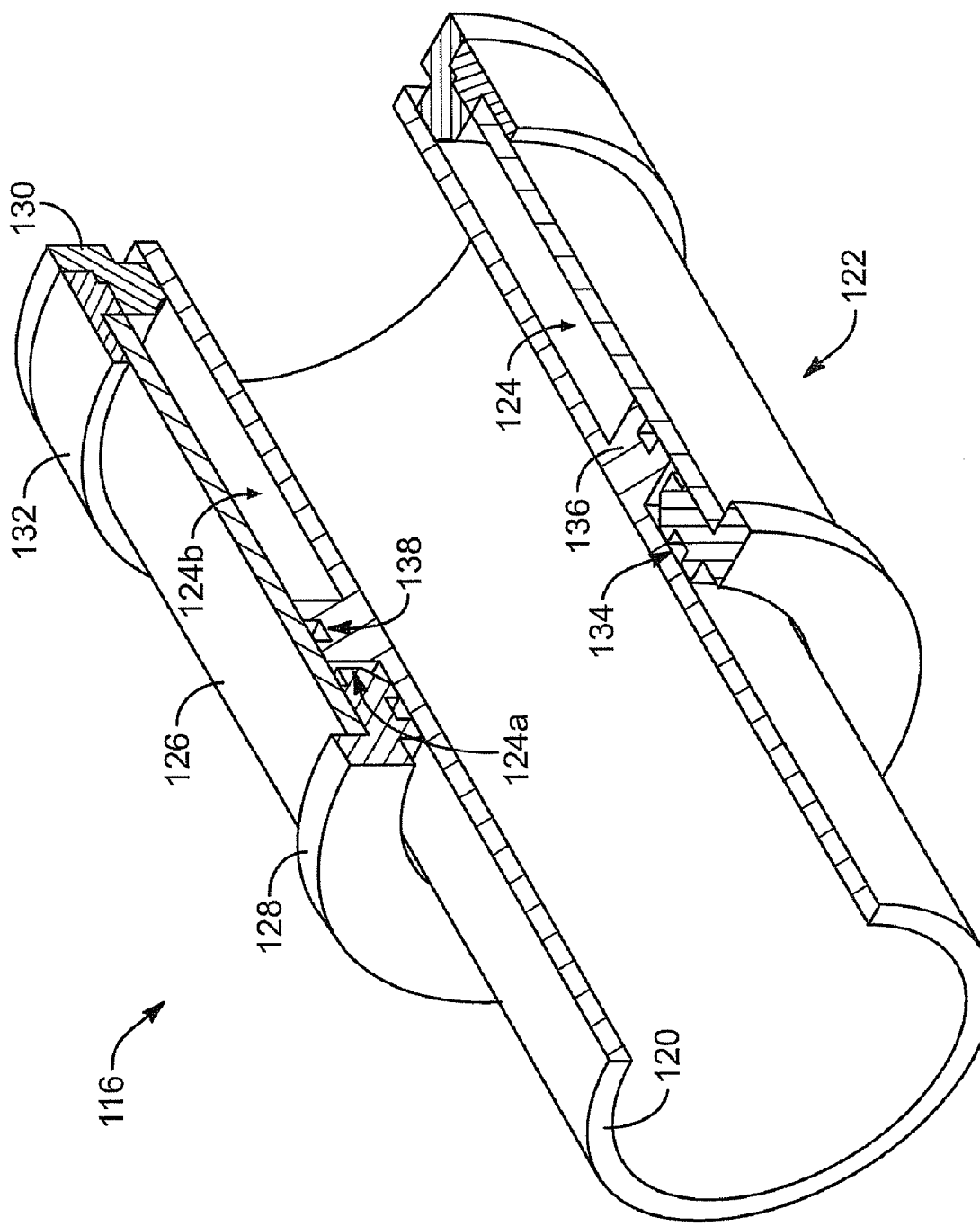
FIG. 10 is a cut-away perspective view of a spacer in accordance with the present invention.
Figure 11:
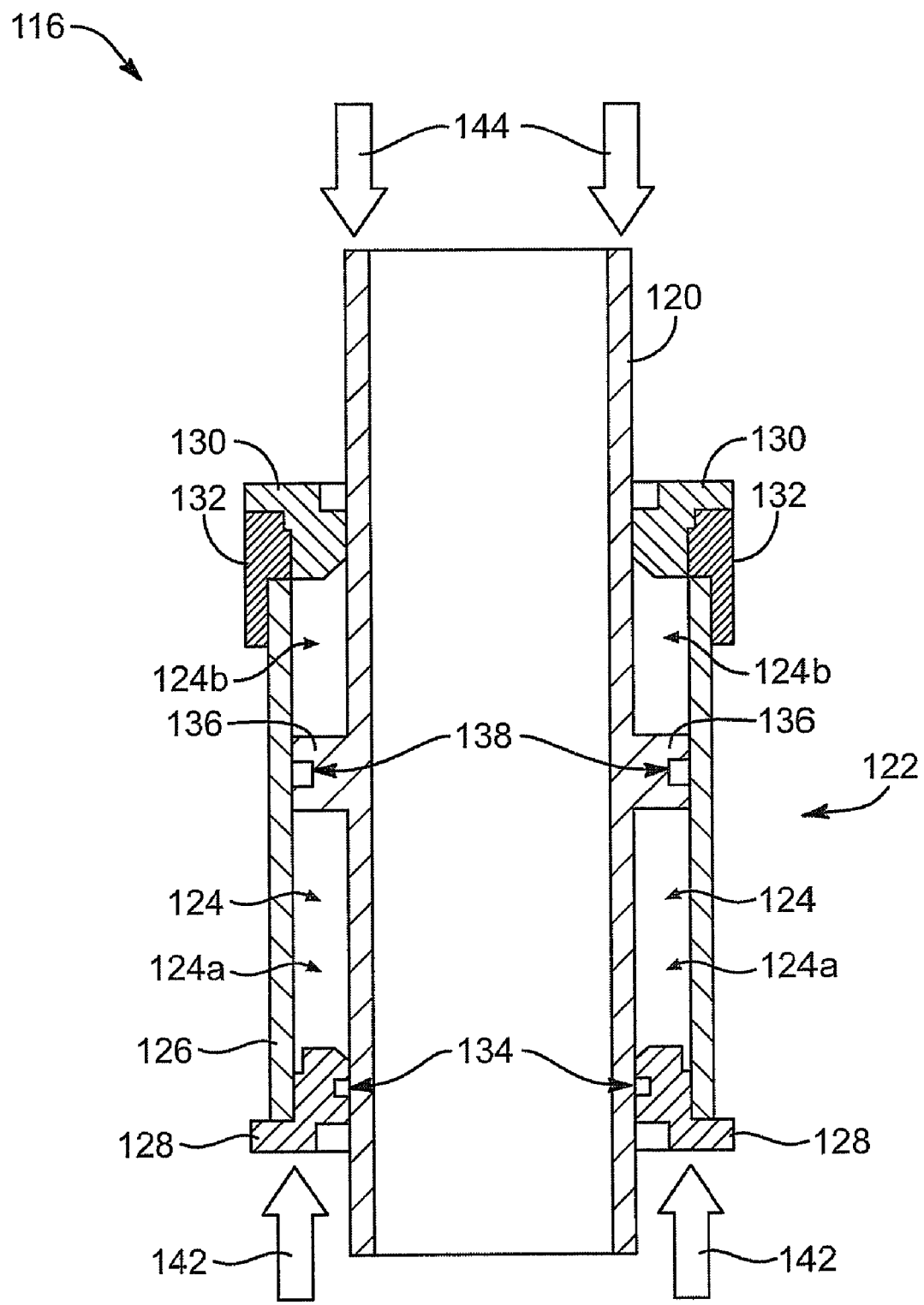
FIG. 11 is a side cross-sectional view of the spacer in an intermediate position in accordance with the present invention.

Referring to FIGS. 10 and 11, in selected embodiments, a spacer 116 may be embodied as a hydraulic cylinder. For example, a spacer 116 may include a base 120 and a slide 122. A base 120 may be configured as a hollow cylinder. A slide 122 may also have a substantially cylindrical shape and surround the base 120 to form an enclosure 124 between an interior of the slide 122 and a portion of the exterior of the base 120.

In one embodiment, a slide 122 may include a sleeve 126, two end caps 128, 130, and one or more mounting collars 132 facilitating assembly or securement of one of the end caps 128, 130 to the sleeve 126. A sleeve 126 may be of cylindrical shape and have an inner diameter greater than the outer diameter of the base 120. The end caps 128, 130 may be generally annular in shape and fill the gap between the sleeve 126 and the base 120. One or both of the end caps 128, 130 may include a groove 134 for receiving a seal, sealing the interface between the end cap 128, 130 and the base 120. The end caps 128, 130 and mounting collar 132 may be secured to the sleeve 126 or to each other in any suitable manner. In one embodiment, the end caps 128, 130, mounting collar 132, and sleeve 124 may be welded together.

An extension 136 may extend from the exterior of the base 120 to slidingly engage or abut the interior of the slide 122. Accordingly, the extension 136 may divide the enclosure 124 into two enclosures 124a, 124b. An extension 136 may include a groove 138 for receiving a seal, sealing the interface between the extension 136 and the interior of the slide 122.

In certain embodiments, a spacer 116 in accordance with the present invention may comprise a single-acting hydraulic cylinder. In one such embodiment, one portion 124a of the enclosure 124 may be occupied by hydraulic fluid, while the other portion 124b of the enclosure 124 may be vacant and vented to the surrounding environment. Accordingly, when hydraulic fluid is pumped through an aperture in the sleeve 126 into the occupied enclosure 124b, the slide 122 may advance along the base 120. Conversely, when a valve controlling release of hydraulic fluid from the occupied enclosure 124a is opened, hydraulic fluid may flow from the spacer 116 causing the slide 122 to retreat. In certain embodiments, that retreat may be urged by the weight of the vehicle 14. Alternatively, the spacer 116 may be configured as a double-acting hydraulic cylinder. In such an embodiment a pump 112 may control both the extension and contraction of the spacer 116.

Figure 12:
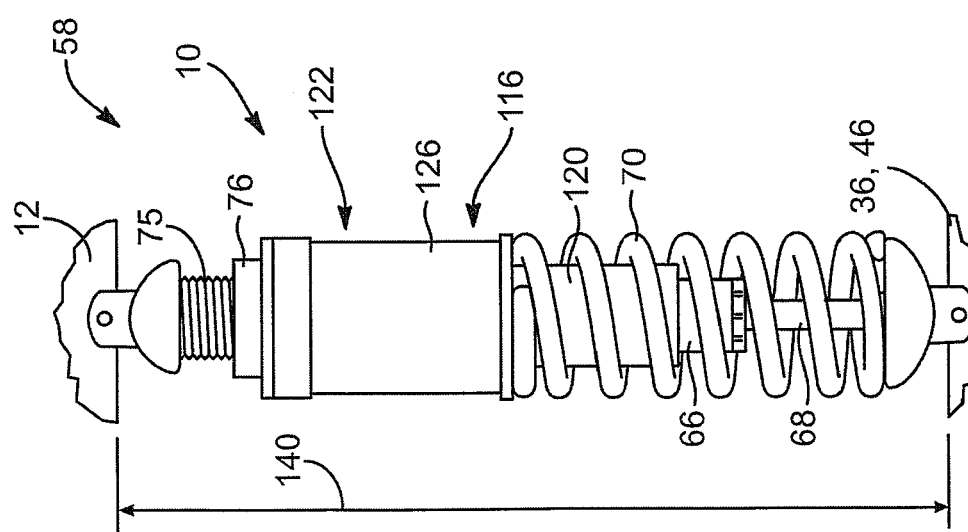
FIG. 12 is a side elevation of a shock assembly equipment with a spacer providing a minimum shock length in accordance with the present invention.

Referring to FIGS. 11 and 12, in selected embodiments, a vehicle 14 in accordance with the present invention may include a frame 12 and one or more axles 36, 46 spaced some distance 140 from the frame 12. A suspension system 10 may connect the axles 36, 46 to the frame 14. One or more spacers 116 may be applied to the suspension system 10 and effect a change in vehicle height. For example, a spacer 116 may manipulate a shock assembly 58 and change the distance between the axles 36, 46, and the frame 14.

In selected embodiments, it may be desirable to replace the upper spring 72 of a shock assembly 58 with a spacer 116 in accordance with the present invention. In one such embodiment, a lower spring 70 may apply an upward force 140 on an end cap 126 of the spacer 116. Similar, a stop 76 threaded onto the body 66 of a shock 58 may apply a downward force 142 on an end of the base 120. So configured, when hydraulic fluid is pumped into the occupied enclosure 124a, the spacer 116 may increase the distance between the top of the lower spring 70 and the bottom of stop 76. To minimize the length of a shock assembly 58 as illustrated in FIG. 12, the occupied enclosure 124*a* of a spacer 116 may be substantially emptied of hydraulic fluid.

Figure 13:
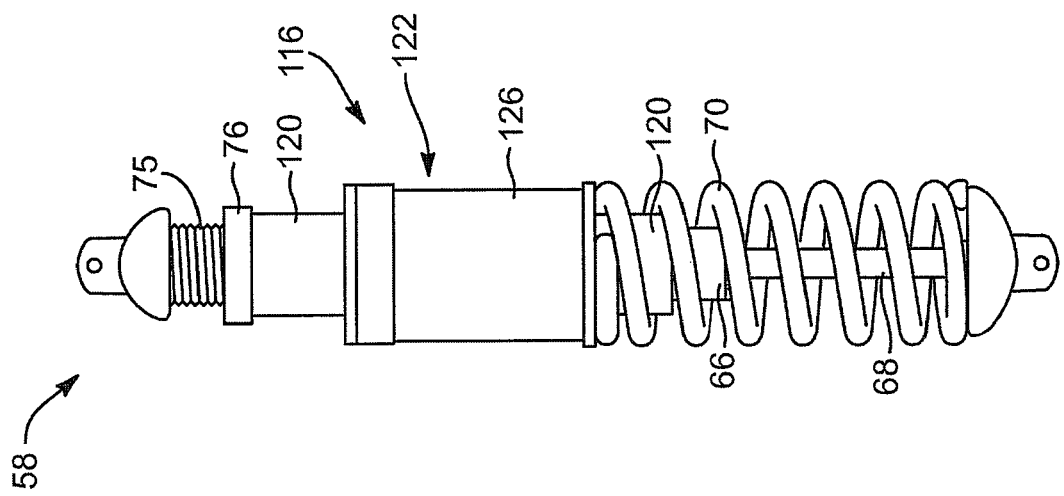
FIG. 13 is a side elevation of a shock assembly equipment with a spacer providing an intermediate shock length in accordance with the present invention.

Referring to FIG. 13, because actuation of a spacer 116 does not increase the weight of the vehicle 14, it will not change the load supported by the springs 70. Accordingly, the steady-state compression of the springs 70 is not affected by movement of a spacer 116. Movement of a spacer 116 may simply adjust the equilibrium position of the shaft 68 within the shock body 66.

For example, as hydraulic fluid is pumped into the occupied enclosure 124*a* of a spacer 116, the slide 122 may move with respect to the base 120. However, because the springs 70 do not experience any additional steady-state compression by such movement, the slide 122 does not effectively move with respect to the spring 70 or the bottom portion of the shock 58. Rather, it is the base that moves upward, lifting the vehicle 14 and establishing a new, lower equilibrium position of the shaft 68 within the shock body 66.

Figure 14:
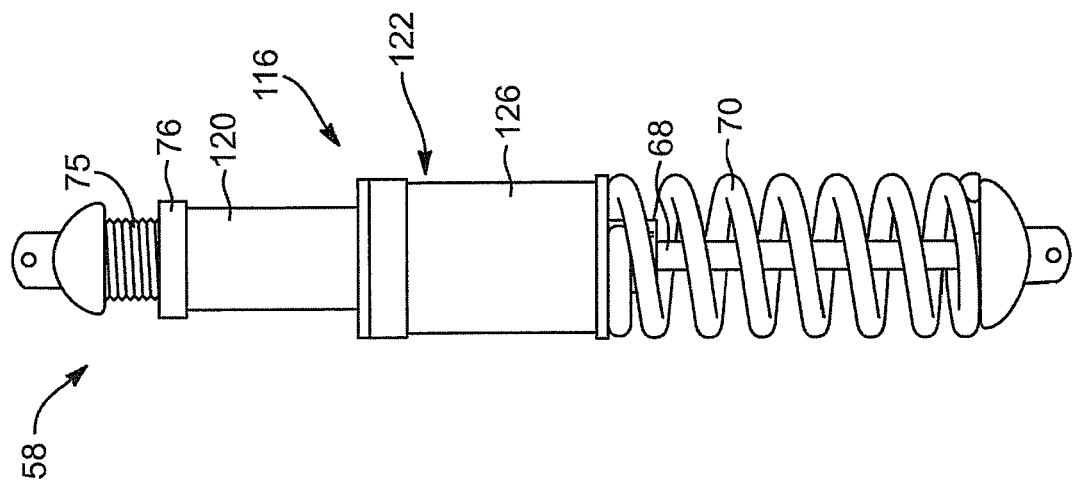
FIG. 14 is a side elevation of a shock assembly equipment with a spacer providing a maximum shock length in accordance with the present invention.

Referring to FIG. 14, with continued pumping of hydraulic fluid into the occupied enclosure 124*a* of a spacer 116, the slide 122 may continue to move with respect to the base 120. Again, because the springs 70 do not experience any additional steady-state compression by such movement, the slide 122 does not effectively move with respect to the spring 70. The base moves upward, lifting the vehicle 14 and establishing a new, even lower equilibrium position of the shaft 68 within the shock body 66.

A spacer 116 may continue to so manipulate a shock assembly 58 until further movement would position the shaft 68 at too much of an extreme within the shock body 66. There may not be any specific formula for determining when that occurs. It may be more dependent on anticipated terrain than on any structural constraints of the shock 58. Alternatively, a spacer 116 may continue to manipulate a shock assembly 58 until the spacer 116 reaches an end of its range of motion.

Hydraulic fluid may be delivered to a spacer 116 in sufficiently small increments to allow a substantial continuum of positions or heights. For example, at a lowest setting the height of the vehicle 14 may be minimized. That minimized height may correspond to a lowest possible setting or positioning of the shaft 68 within the shock body 66. Similarly, a second setting may correspond to a maximum height of a vehicle 14. This maximum height may correspond to a maximum position the shaft 68 within the shock body 66. Both the maximum and minimum positions of the shaft 68 within the shock body 66 may provide adequate damping for the vehicle 14. That is, neither position may be so extreme as to degrade the shock absorbing performance of the shock assembly 58. Between the extremes of minimum and maximum height, one or more discrete positions or heights may be dictated by a spacer 116 or an array of spacers 116.

In certain embodiments, a vehicle 14 in accordance with the present invention may include four shock assemblies 58*a*, 58*b*, 58*c*, 58*d*. If desired, a spacer 116 in accordance with the present invention may be applied to each of those shock assemblies 58*a*, 58*b*, 58*c*, 58*d*. Relative to one another, those spacers 116 may act in unison or otherwise. For example, in selected embodiments, all spacers 116 may act in unison to provide a uniform increase in the height for the four quadrants of the vehicle 14. However, in other embodiments, the spacers 116 may act individually to provide specific and custom adaptations to the terrain at hand.

The present invention may be embodied in other specific forms without departing from its basic principals of operation or essential structural characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A vehicle comprising:
    a frame;
    an axle spaced a distance from the frame;
    a suspension assembly connecting the axle to the frame, the assembly having a shock absorber and a coil spring coaxially surrounding the shock absorber;
    a hydraulic system comprising a spacer selectively changing in length, thereby manipulating the suspension assembly and changing the distance between the axle and the frame, the spacer acting, between changes in length, as a substantially rigid body;
    the spacer further comprising a base and a slide, the base configured as a hollow substantially cylindrical element, the slide having a substantially cylindrical shape and surrounding the base to form an enclosure between the interior of the slide and the exterior of the base, the enclosure being configured to receive hydraulic fluid; and
    an extension extending from the exterior of the base to slidingly engage the interior of the slide, the extension further comprising a groove for receiving a seal for sealing the interface between the extension and the interior of the slide, the extension being configured to divide the enclosure into a first enclosure portion and a second enclosure portion.

2. The vehicle of claim 1, wherein the spacer coaxially surrounds the shock absorber.

3. The vehicle of claim 2, wherein the hydraulic system further comprises a pump.

4. The vehicle of claim 3, wherein the hydraulic system comprises a power steering system.

5. The vehicle of claim 4, wherein the spacer comprises a single-acting hydraulic cylinder.

6. The vehicle of claim 5, wherein the spacer extends under impetus of the pump.

7. The vehicle of claim 6, wherein the spacer contracts under the weight of the vehicle.

8. The vehicle of claim 1, wherein:
    the first enclosure portion is configured to receive the hydraulic fluid and the second enclosure portion is configured to be vacant of hydraulic fluid and vented to the surrounding environment; and
    hydraulic fluid is introduced to and released from the first enclosure portion so as to move the slide relative to the base and thereby change the distance between the axle and the frame.

9. The vehicle of claim 1, wherein:
    the suspension assembly comprises a shock absorber and a coil spring coaxially surrounding the shock absorber; and
    the spacer coaxially surrounds the shock absorber.

10. The vehicle of claim 1, wherein the hydraulic system further comprises a pump.

11. The vehicle of claim 1, wherein the hydraulic system comprises a power steering system.

12. The vehicle of claim 1, wherein the spacer comprises a single-acting hydraulic cylinder.

13. The vehicle of claim 1, wherein:
    the hydraulic system further comprises a pump; and
    the spacer extends under impetus of the pump.

14. The vehicle of claim 1, wherein the spacer contracts under the weight of the vehicle.

15. A vehicle comprising:

a frame;

an axle spaced a distance from the frame and having a first end and a second end;

a suspension assembly connecting the frame to the axle and comprising a first shock assembly connecting the first end of the axle to the frame and a second shock assembly connecting the second end of the axle to the frame;

a hydraulic system comprising first and second spacers selectively changing in length in unison, thereby manipulating the first and second shock assemblies, respectively, and changing the distance between the frame and axle, the first and second spacers each acting, between changes in length, as a substantially rigid body;

the first and second spacers further comprising a base and a slide, the base configured as a hollow cylinder, the slide having a substantially cylindrical shape and surrounding the base to form an enclosure between the interior of the slide and the exterior of the base, the enclosure being configured to receive hydraulic fluid; and each spacer further comprises a single-acting hydraulic cylinder and an extension extending from the exterior of the base to slidingly engage the interior of the slide, the extension further comprising a groove for receiving a seal for sealing the interface between the extension and the interior of the slide, the extension is configured to divide the enclosure into a first enclosure portion and a second enclosure portion, the first enclosure portion being configured to receive the hydraulic fluid and the second enclosure portion being vacant and vented to the surrounding environment.

16. The vehicle of claim 15, wherein the hydraulic system comprises a power steering system.

17. A vehicle comprising:

a frame;

front and rear axles, each spaced a distance from the frame;

a plurality of wheel assemblies distributed to connect to the front and rear axles;

a suspension system comprising shock assemblies, each including a shock absorber positioned with a coil spring, the shock assemblies distributed to connect each of the front and rear axles to the frame;

a power steering system reducing the steering effort demanded of a user to steer the wheel assemblies of the plurality of wheel assemblies corresponding to the front axle;

the power steering system further comprising single-acting hydraulic cylinders extending in unison, each positioned coaxially with respect to a shock assembly of the shock assemblies and selectively changing in length, thereby changing the length of the shock assembly and the distance between the frame and the front and rear axles, the single acting hydraulic cylinders acting, between changes in length, as substantially rigid bodies;

each single-acting hydraulic cylinder further comprising a spacer having a base and a slide, the base configured as a hollow substantially cylindrical element, the slide having a substantially cylindrical shape and surrounding the base to form an enclosure between the interior of the slide and the exterior of the base, the enclosure being configured to receive hydraulic fluid; and an extension extending from the exterior of the base to slidingly engage the interior of the slide, the extension further comprising a groove for receiving a seal for sealing the interface between the extension and the interior of the slide, the extension being configured to divide the enclosure into a first enclosure portion and a second enclosure portion.

* * * * *